United States Patent Office

2,875,201
DEHYDROTIGOGENONE INTERMEDIATES

William F. Johns, Morton Grove, Ill., assignor to G. D. Searle & Co., Chicago, Ill., a corporation of Delaware No Drawing. Application August 28, 1957
Serial No. 680,664

3 Claims. (Cl. 260—239.55)

This invention relates to dehydrotigogenone intermediates to Ring-A-aromatized steroidal medicaments. More particularly this invention relates to compounds of the formula

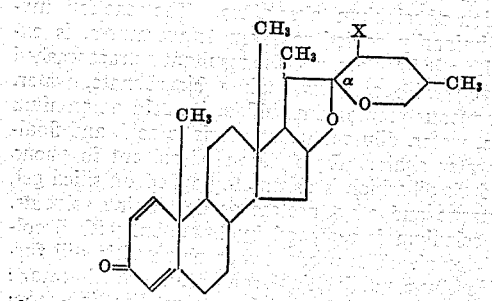

wherein X is either hydrogen or bromine.

The fact that the subject compositions serve as stepping stones in the manufacture of $\Delta^{1,3,5}$ steroids—such as, for example, estrone—is of substantial commercial importance in the pharmaceutical industry, since the latter materials not only are prized for their inherently useful pharmacological properties, but additionally are in demand as starting materials for the manufacture of the 19-nor steroids, viz., 17α-ethyl-17-hydroxynorandrostenone (Nilevar).

Illustrative of the adaptability of the compounds of this invention to valuable steroid manufacture, 22α-spirosta-1,4-dien-3-one, the product of Example 1 (and obtained either as disclosed therein or from the corresponding 23-bromo compound of Example 2 by heating with sodium iodide in acetic acid under nitrogen), is pyrolyzed with the elimination of methane according to well-known techniques described in considerable detail as applied to comparable 1,4-dien-3-ones by Inhoffen, U. S. 2,280,828, and Rubin et al., U. S. 2,594,349. The spiro triene thus obtained

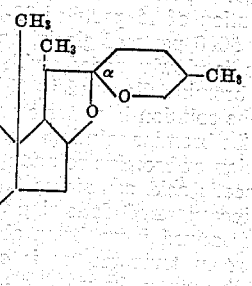

is treated with dimethyl sulfate to protect the 3-hydroxyl group, then subjected to acetolysis with acetic anhydride at 200° centigrade to give the corresponding furosten (nee "pseudosapogenin"), the first step in the classic degradation of the sapogenin side-chain, developed by R. E. Marker (1940–1949) and reported in such fundamental source books as Fieser and Fieser, Organic Chemistry, 3rd ed. (Reinhold, 1956), pp. 993 ff. There results 26-acetoxy-3-methoxy-19-nor-furosta-1,3,5,20(22)-tetraene

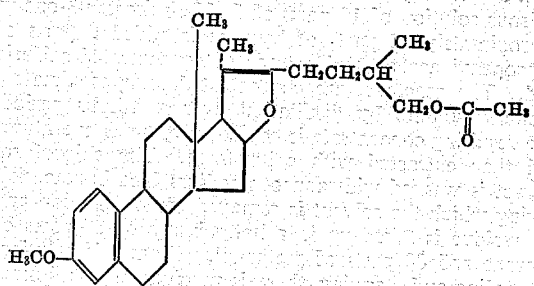

which, upon mild oxidation with chromium trioxide, gives the "diosone"

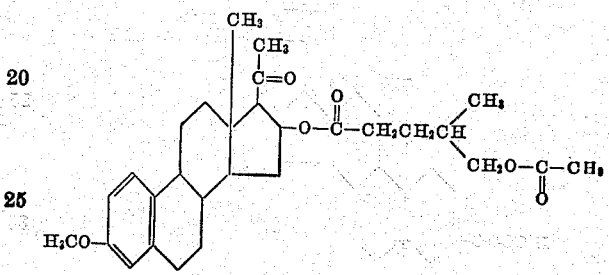

The diosone is hydrolyzed with potassium carbonate, sodium bicarbonate, or an alkali metal alkanoate to give the pregnatetraene

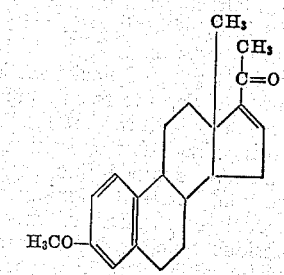

which, in turn, is reduced to the corresponding triene with hydrogen and palladium catalyst. The latter material

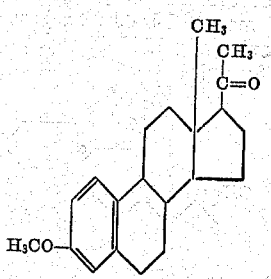

can be variously converted to estrone-3-methyl ether, one method involving preliminary formation of the 17,20-enol acetate with acetic anhydride and a little p-toluenesulfonic acid, followed by ozonolysis. Other means to the estrone ether are afforded by the Baeyer-Villiger reaction, and fermentation.

The following examples describe in detail certain of the methods which have been devised for preparing the dehydrotigogenones of the present invention. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

A. *3 - acetoxy - 5α,22α - spirost - 2 - ene.*—To an anhydrous solution of 10 parts of 5α,22α-spirostan-3-one in approximately 70 parts of benzene is added 9 parts of isopropenyl acetate and a trace of concentrated sulfuric acid. The reactants are concentrated to approximately one-half volume by distillation over a 4-hour period. The resulting concentrate is cooled to room temperatures and then extracted with chloroform. The chloroform extract is washed with aqueous sodium bicarbonate, following which the solvent is removed by evaporation and the residue is taken up in a hot mixture of 80 parts of benzene and 80 parts of methanol. From this solution, on cooling and standing, there is precipitated the desired enol acetate, of the formula

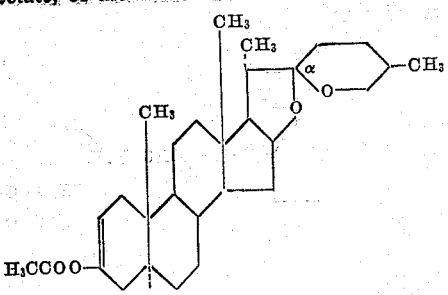

and which melts in the range 234–244° C.

B. *2-bromo-5α,22α-spirostan-3-one.*—To a solution of 6 parts of 3-acetoxy-5α,22α-spirost-2-ene in a mixture of 192 parts of carbon tetrachloride and 180 parts of chloroform at 0° C. is added, with vigorous agitation, 3 parts of powdered potassium carbonate followed by 2 parts of bromine dissolved in 15 parts of glacial acetic acid. The reactants are allowed to warm to room temperatures with continued agitation, during which time the bromine color disappears. At this point—after approximately 15 minutes—the reactants are dumped into aqueous sodium thiosulfate, whereupon the resultant mixture is extracted with ether. Vacuum evaporation of solvent leaves a semi-crystalline residue which is taken up in chloroform and recrystallized on addition of butanone. The product thus obtained is recovered by filtration, washed with acetone, and further purified by recrystallization from a mixture of chloroform and ethyl acetate. There is obtained by this means 2-bromo-5α,22α-spirostan-3-one, melting at approximately 254° C. (with decomposition), and having the formula

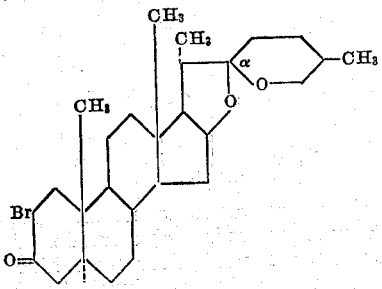

C. *5α,22α-spirost-1-en-3-one.*—A solution of 5 parts of 2-bromo-5α,22α-spirostan-3-one in 30 parts of warm dimethylformamide is added to 33 parts of 2,4,6-trimethylpyridine at the boiling point. Boiling under reflux is maintained for 4 hours, following which the reactants are chilled and dumped into an excess of ice cold aqueous 40% muriatic acid. The resultant mixture is extracted with a combination of benzene and ether, and the extract thus obtained washed with ice-cold aqueous 20% muriatic acid. Evaporation of solvent leaves a crystalline residue which is recrystallized from a mixture of acetone and methanol to give 5α,22α-spirost-1-en-3-one, the melting point of which is 201–204° C. The product has the formula

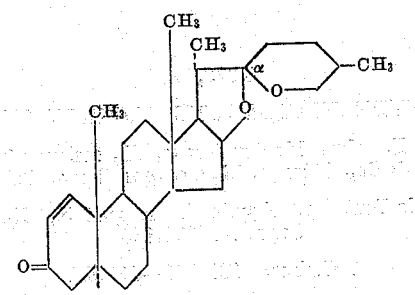

D. *22α-spirosta-1,4-dien-3-one.*—A mixture of 5 parts of 5α,22α-spirost-1-en-3-one, 192 parts of 2-methyl-2-butanol, 4 parts of glacial acetic acid, and 2 parts of selenium dioxide is heated at the boiling point under reflux in an atmosphere of nitrogen for 65 hours. A heavy precipitation of selenium takes place. The reaction mixture, preliminarily cooled to room temperatures, is extracted with ethyl acetate, and the resultant extract washed consecutively with aqueous sodium bicarbonate, water, ice-cold aqueous ammonium sulfide, ice-cold ammonium hydroxide, water, dilute aqueous muriatic acid, and finally with water again. Evaporation of solvent in vacuo leaves a dark oil which is chromatographed on silica gel, using benzene and ethyl acetate as developing solvents. Residual selenium is removed by treatment with decolorizing charcoal. The product thus obtained is still further purified by crystallization from a mixture of acetone and normal pentane, followed by recrystallization from ether. There results 22α-spirosta-1,4-dien-3-one, of the formula

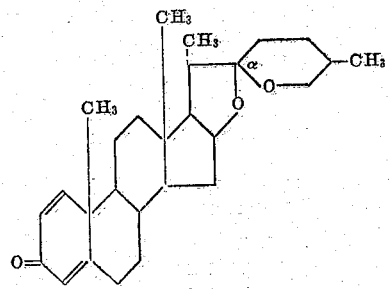

the melting point of which is approximately 204–205° C.

*Example 2*

A. *2,4,23 - tribromo - 5α,22α - spirostan - 3 - one.*—To a solution of 15 parts of 23-bromo-5α,22α-spirostan-3-one in 5000 parts of glacial acetic acid at room temperatures is slowly added, with vigorous agitation, 10 parts of bromine dissolved in 600 parts of glacial acetic acid. The solution becomes cloudy when approximately 15% of the bromine solution has been introduced. After the addition of bromine solution is complete, 25 parts of glacial acetic acid containing 2 parts of hydrogen bromide is incorporated, following which 360 parts of chloroform is mixed in to bring about re-solution. Agitation at room temperatures is continued one-half hour longer, whereupon the reactants are dumped into water and the resultant mixture extracted with chloroform. The extract is consecutively washed with water, aqueous sodium thiosulfate, and aqueous sodium bicarbonate, following which solvent is distilled off and the residue chromatographed on silica gel, using benzene as a developing solvent. The 2,4,23-tribromo-5α,22α-spirostan-3-one thus obtained is further purified by recrystallization from acetone, to give a colorless product, the melting point of which is approximately 210° C. (with decomposition). The product has the formula

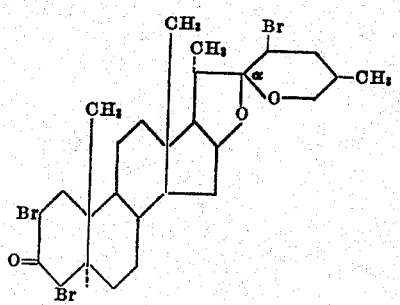

B. *23-bromo-22α-spirosta-1,4-dien-3-one.*—A solution of 1 part of 2,4,23-tribromo-5α-22α-spirostan-3-one in 35 parts of 2,4,6-trimethylpyridine is maintained at the boiling point under reflux for 40 minutes. The reactants are then cooled and dumped into ice-cold aqueous 20% muriatic acid. The resultant mixture is extracted with ether. Removal of solvent by distillation leaves an oily product which is purified by chromatography on silica gel, using benzene and ethyl acetate as developing solvents. Recrystallization from a combination of ether and mixed hexanes affords pure 23-bromo-22α-spirosta-1,4-diene-3-one, melting at approximately 201° C. (with decomposition), the formula of which is

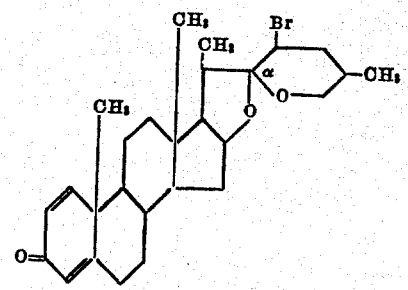

What is claimed is:
1. A compound of the formula

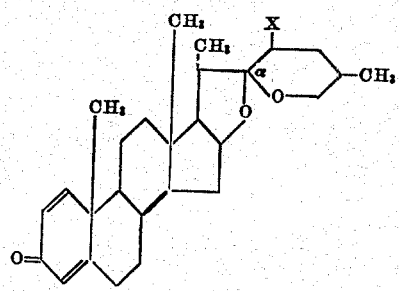

wherein X is selected from the group consisting of hydrogen and bromine.
2. 22α-spirosta-1,4-dien-3-one.
3. 23-bromo-22α-spirosta-1,4-dien-3-one.

References Cited in the file of this patent
UNITED STATES PATENTS
2,676,174    Rosenkranz et al. _____ Apr. 20, 1954
OTHER REFERENCES
Ringold et al.: J. Org. Chem. 21 (February 1956), pages 239–40.
Szpilfogel et al.: Rec. Trav. Chim. 75 (1956), pages 475–80.